Nov. 22, 1932.  J. C. SCHELLIN  1,888,741
HOSE COUPLING
Filed July 19, 1932
Fig.1.
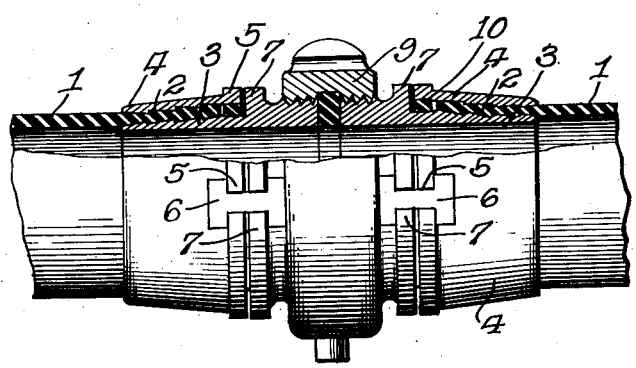
Fig.2.
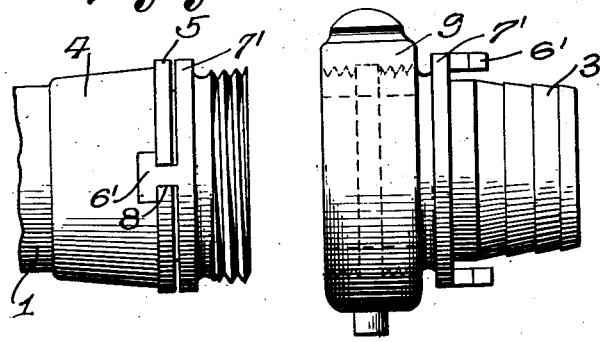
Fig.3.
Fig.4.
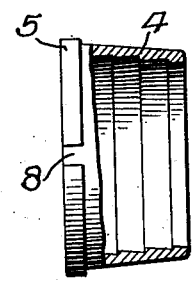
Fig.5.
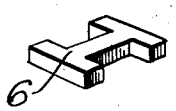
Inventor
John C. Schellin
By Hiram Swartz Atty.

Patented Nov. 22, 1932

1,888,741

UNITED STATES PATENT OFFICE

JOHN C. SCHELLIN, OF WOOSTER, OHIO

HOSE COUPLING

Application filed July 19, 1932. Serial No. 623,319½.

My invention relates to improvements in hose couplings, and particularly to improved means for uniting the hose line securely to the shank of the ordinary coupling, and to the novel manner of holding the hose fast in the coupling, as hereinafter set forth.

Heretofore it has been necessary to forcibly expand a metal thimble within the hose terminus, after inserting the thimble within said terminus, and at the same time, forcibly expand said hose terminus against the male or female section as a means of holding the parts together permanently.

Couplings of this character are difficult to construct, and too expensive for service, and are liable to injure the hose at its intersection with the metal ring or thimble by the expansion of the latter within it.

In my device it is not necessary to expand the metal members upon the hose because the shank of the male or female member is manually inserted in the hose, tapering outwardly to a thin edge so as to gradually expand the hose terminus, instead of expanding an expansion ring, as heretofore. Better results are acquired by forcing an outer sleeve over the sloping end of the shank and expanded hose, thereby compressing the hose tightly between the corrugated surfaces of the tapered shank and the outer sleeve, said corrugations being in the same relative positions with respect to the intervening hose terminus, and the tapered shank being integral with the tail section of the coupling.

The shank and sleeve are each provided with a projecting rim adapted to abut against each other when the sleeve is drawn over the hose terminus and to be solidly held together by means of a key member fitted to engage both of them as hereinafter stated.

By such construction the hose can be attached or re-attached more readily in the field than is possible with the expansion ring type coupling, because of the necessity of expanding the ring or thimble, into the coupling by means of a specially built tool for such purpose, which my device does not require.

My invention is illustrated by the accompanying drawing in which similar letters and figures of reference indicate like parts. Referring thereto, Fig. 1 is a side view of a hose coupling embodying my invention, partly cut away in section to better illustrate the interior construction. Fig. 2 is a side view of the male member of my coupling, and Fig. 3 is a like view of the female member with the outer sleeve removed therefrom.

Fig. 4 a side view of the sleeve member detached and partly in section, and Fig. 5 is a perspective view of a key member, detached, for holding the tail piece and sleeve member together as hereafter stated. The hose terminus 1 is penetrated by the sloping shank 3 whereby the hose is flared, and the sleeve (Fig. 4) is constructed with a like flare internally, so as to be drawn over the shank 3 and the intervening hose terminus tightly whereby the adjacent corrugated surfaces of the shank and sleeve will snugly grip and permanently hold said terminus between them, as shown in Fig. 1.

Additional means for holding said members together are provided by a key member (Fig. 5) having lugs 6, adapted to engage the projecting rim 5 of the sleeve member 4 when forced into a notch 8 therein, and may be connected with the rim 7' on the tail piece 7, as shown in Fig. 1, or, if preferred, may be integral therewith, as shown in Figs. 2 and 3.

By such means, it is apparent the hose may be readily attached or detached from the coupling without expanding either of the metal parts, by simply prying out the key member from said notches, or forcing the same therein so as to not readily escape therefrom during usage, in any well known way.

The tapered sleeve 4 is spaced apart from the correspondingly tapered shank 3, a limited distance to tightly admit the hose terminus 2 between them, and the adjacent corrugations are so arranged as to tighten upon the hose by lineal draft thereon, and, if desired, and to prevent leakage, a washer 10, of felt or the like, may be interposed at the inner end of the hose, as shown in Fig. 1. Moreover, by such construction, including the taper of the shank to a thin edge, there is given to the stream a full flow thru the coupling without any obstruction, and the hose terminus is flared outwardly sufficient to prevent forcible withdrawal, without injury to its fabric by the expansion thereof.

I am aware it is not new to insert and expand to a cone shape, an expansible thimble within the hose terminus, adapted to engage the outer tail member of the coupling, and such I do not broadly claim, but what I claim is—

1. In a hose coupling, the combination with the tail section of the coupling, a tapered shank integral therewith, a rim bordering said section adjacent the tapered shank, a tapered sleeve spaced apart a limited distance from said tapered shank, a rim bordering said tapered sleeve adapted to abut against the rim on said tapered shank when said sleeve is forcibly drawn over a hose terminus interposed between them, and means, including a key member adapted to engage said abutting rims and hold them in juxtaposition, substantially as set forth.

2. A hose coupling, comprising in combination, a tapered shank integral with the tail section of the coupling, a tapered sleeve corresponding to said tapered shank and spaced apart therefrom a limited distance to tightly engage the terminal portion of a hose line drawn over said tapered shank, a rim bordering said sleeve adapted to abut against a like rim bordering said tail piece adjacent said tapered shank, corrugations on the adjacent surfaces of said shank and sleeve adapted to engage a hose terminus interposed between them and arranged to tighten thereon by draft on said hose, and means, including a key member adapted to engage said sleeve rim to hold the latter snugly against the rim on said tail piece, substantially as set forth.

In witness whereof, I hereunto set my hand this 25th day of May, A. D. 1932.

JOHN C. SCHELLIN.